(12) United States Patent
Marsden et al.

(10) Patent No.: US 7,722,756 B2
(45) Date of Patent: *May 25, 2010

(54) PROCESS FOR MULTIPLE STAGE DIRECT ELECTROWINNING OF COPPER

(75) Inventors: John O Marsden, Phoenix, AZ (US); Joanna M Robertson, Thatcher, AZ (US); Robert E Brewer, Park City, UT (US); Susan R. Brewer, legal representative, Park City, UT (US); David R Baughman, Golden, CO (US); Philip Thompson, West Valley, UT (US); Wayne W Hazen, Lakewood, CO (US); Christel M. A. Bemelmans, Indian Hills, CO (US)

(73) Assignee: Freeport-McMoran Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/274,035

(22) Filed: Nov. 19, 2008

(65) Prior Publication Data

US 2009/0071839 A1 Mar. 19, 2009

Related U.S. Application Data

(63) Continuation of application No. 11/163,761, filed on Oct. 28, 2005, now Pat. No. 7,462,272.

(60) Provisional application No. 60/623,199, filed on Oct. 29, 2004.

(51) Int. Cl.
C25C 1/12 (2006.01)
(52) U.S. Cl. .................. 205/580; 205/574; 205/581; 205/584; 205/585; 205/586; 74/740; 74/743
(58) Field of Classification Search ............... 205/574, 205/580, 581, 584, 585, 586; 74/740, 743
See application file for complete search history.

(56) References Cited

U.S. PATENT DOCUMENTS 3,260,593 A 7/1966 Zimmerley et al.

(Continued)

FOREIGN PATENT DOCUMENTS

AU 0219785 12/1958

(Continued)

OTHER PUBLICATIONS

ISR and Written Opinion from related International Application No. PCT/US2004/042036 dated Apr. 24, 2006.

(Continued)

*Primary Examiner*—Bruce F Bell
(74) *Attorney, Agent, or Firm*—Snell & Wilmer L.L.P.

(57) ABSTRACT

A system and process for recovering copper from a copper-containing ore, concentrate, or other copper-bearing material to produce high quality cathode copper from a leach solution without the use of copper solvent/solution extraction techniques or apparatus. A process for recovering copper from a copper-containing ore generally includes the steps of providing a feed stream containing comminuted copper-containing ore, concentrate, or other copper-bearing material, leaching the feed stream to yield a copper-containing solution, conditioning the copper-containing solution through one or more physical or chemical conditioning steps, and electrowinning copper directly from the copper-containing solution in multiple electrowinning stages, without subjecting the copper-containing solution to solvent/solution extraction prior to electrowinning.

12 Claims, 3 Drawing Sheets

U.S. PATENT DOCUMENTS

| | | |
|---|---|---|
| 3,528,784 A | 9/1970 | Green |
| 3,637,371 A | 1/1972 | Mackiw et al. |
| 3,656,888 A | 4/1972 | Barry et al. |
| 3,669,651 A | 6/1972 | Spedden et al. |
| 3,775,099 A | 11/1973 | Coffield et al. |
| 3,868,440 A | 2/1975 | Lindblad et al. |
| 3,896,208 A | 7/1975 | Dubeck et al. |
| 3,917,519 A | 11/1975 | Fisher et al. |
| 3,949,051 A | 4/1976 | Pawlek et al. |
| 3,958,985 A | 5/1976 | Anderson et al. |
| 3,961,028 A | 6/1976 | Parker et al. |
| 3,962,402 A | 6/1976 | Touro |
| 3,967,958 A | 7/1976 | Coffield et al. |
| 3,985,553 A | 10/1976 | Kunda et al. |
| 3,991,159 A | 11/1976 | Queneau et al. |
| 4,017,309 A | 4/1977 | Johnson |
| 4,020,106 A | 4/1977 | Ackerley et al. |
| 4,028,462 A | 6/1977 | Domic et al. |
| 4,029,733 A | 6/1977 | Faugeras et al. |
| 4,039,405 A | 8/1977 | Wong |
| 4,039,406 A | 8/1977 | Stanley et al. |
| 4,046,851 A | 9/1977 | Subramanian et al. |
| 4,066,520 A | 1/1978 | Emmett, Jr. et al. |
| 4,069,119 A | 1/1978 | Wong |
| 4,091,070 A | 5/1978 | Riggs et al. |
| 4,093,526 A | 6/1978 | Blanco et al. |
| 4,120,935 A | 10/1978 | Fountain et al. |
| 4,150,976 A | 4/1979 | Dain |
| 4,157,912 A | 6/1979 | Weir et al. |
| 4,165,362 A | 8/1979 | Reynolds |
| 4,256,553 A | 3/1981 | Baczek et al. |
| 4,266,972 A | 5/1981 | Redondo Abad et al. |
| 4,272,341 A | 6/1981 | Lamb |
| 4,338,168 A | 7/1982 | Stanley et al. |
| 4,405,569 A | 9/1983 | Dienstbach |
| 4,415,540 A | 11/1983 | Wilkomirsky et al. |
| 4,498,962 A | 2/1985 | Oda et al. |
| 4,507,268 A | 3/1985 | Kordosky et al. |
| 4,571,264 A | 2/1986 | Weir et al. |
| 4,619,814 A | 10/1986 | Salter et al. |
| 4,775,413 A | 10/1988 | Horton et al. |
| 4,814,007 A | 3/1989 | Lin et al. |
| 4,875,935 A | 10/1989 | Gross et al. |
| 4,880,607 A | 11/1989 | Horton et al. |
| 4,892,715 A | 1/1990 | Horton |
| 4,895,597 A | 1/1990 | Lin et al. |
| 4,971,662 A | 11/1990 | Sawyer et al. |
| 4,992,200 A | 2/1991 | Lin et al. |
| 5,028,259 A | 7/1991 | Lin et al. |
| 5,059,403 A | 10/1991 | Chen |
| 5,073,354 A | 12/1991 | Fuller et al. |
| 5,176,802 A | 1/1993 | Duyvesteyn et al. |
| 5,223,024 A | 6/1993 | Jones |
| 5,232,491 A | 8/1993 | Corrans et al. |
| 5,316,567 A | 5/1994 | Jones |
| 5,356,457 A | 10/1994 | Alvarez et al. |
| 5,431,717 A | 7/1995 | Kohr |
| 5,573,575 A | 11/1996 | Kohr |
| 5,622,615 A | 4/1997 | Young et al. |
| 5,645,708 A | 7/1997 | Jones |
| 5,650,057 A | 7/1997 | Jones |
| 5,670,035 A | 9/1997 | Virnig et al. |
| 5,676,733 A | 10/1997 | Kohr |
| 5,698,170 A | 12/1997 | King |
| 5,730,776 A | 3/1998 | Collins et al. |
| 5,770,170 A | 6/1998 | Collins et al. |
| 5,849,172 A | 12/1998 | Allen et al. |
| 5,869,012 A | 2/1999 | Jones |
| 5,874,055 A | 2/1999 | Jones |
| 5,895,633 A | 4/1999 | King |
| 5,902,474 A | 5/1999 | Jones |
| 5,914,441 A | 6/1999 | Hunter et al. |
| 5,917,116 A | 6/1999 | Johnson et al. |
| 5,985,221 A | 11/1999 | Knecht |
| 5,989,311 A | 11/1999 | Han et al. |
| 5,993,635 A | 11/1999 | Hourn et al. |
| 6,065,122 A | 5/2000 | Wunderlich et al. |
| 6,083,730 A | 7/2000 | Kohr |
| 6,085,330 A | 7/2000 | Hewitt et al. |
| 6,146,444 A | 11/2000 | Kohr |
| 6,149,883 A | 11/2000 | Ketcham et al. |
| 6,199,134 B1 | 3/2001 | Deschepper et al. |
| 6,357,013 B1 | 3/2002 | Kelly et al. |
| 6,360,327 B1 | 3/2002 | Hobson |
| 6,451,089 B1 | 9/2002 | Marsden et al. |
| 6,663,689 B2 | 12/2003 | Marsden et al. |
| 6,676,909 B2 | 1/2004 | Marsden et al. |
| 6,972,107 B2 | 12/2005 | Marsden et al. |
| 7,017,054 B2 | 3/2006 | Schuckler et al. |
| 7,159,046 B2 | 1/2007 | Mulla et al. |
| 7,206,883 B2 | 4/2007 | Ho et al. |
| 7,234,050 B2 | 6/2007 | Agan et al. |
| 7,315,953 B2 | 1/2008 | Su et al. |
| 7,330,926 B2 | 2/2008 | Ho |
| 7,341,700 B2 | 3/2008 | Marsden et al. |
| 7,462,272 B2 * | 12/2008 | Marsden et al. ............ 205/580 |
| 7,476,308 B2 * | 1/2009 | Marsden et al. ............ 205/580 |
| 7,485,216 B2 * | 2/2009 | Marsden et al. ............ 205/584 |
| 2002/0044899 A1 | 4/2002 | Marsden et al. |
| 2003/0019330 A1 | 1/2003 | Marsden et al. |
| 2003/0167413 A1 | 9/2003 | Stachura et al. |
| 2004/0130076 A1 | 7/2004 | Marsden et al. |
| 2004/0146438 A1 | 7/2004 | Marsden et al. |
| 2005/0039063 A1 | 2/2005 | Hsu et al. |
| 2005/0109163 A1 | 5/2005 | Marsden et al. |
| 2005/0126923 A1 | 6/2005 | Marsden et al. |
| 2005/0269209 A1 | 12/2005 | Sandoval et al. |
| 2006/0016684 A1 | 1/2006 | Marsden et al. |
| 2006/0016696 A1 | 1/2006 | Stevens et al. |
| 2006/0016697 A1 | 1/2006 | Gilbert et al. |
| 2006/0144717 A1 | 7/2006 | Marsden et al. |

FOREIGN PATENT DOCUMENTS

| | | |
|---|---|---|
| CL | 16572000 | 6/1999 |
| WO | WO 0100890 | 1/2001 |

OTHER PUBLICATIONS

Beckstead, L.W., et al., "Acid Ferric Sulfate Leaching of Attritor-Ground Chalcopyrite Concentrate," 11 Extractive Metallurgy of Copper 31:611-32 (American Institute of Mining, Metallurgical, and Petroleum Engineers, Inc.) (1976) (no month).

Berezowsky, R.M.G.S., "The Commercial Status of Pressure Leaching Technology," JOM, 43:2, 9-15 (Feb. 1991) (abstract only).

Chmielewski, T., "Pressure Leaching of a Sulphide Copper Concentrate with Simultaneous Regeneration of the Leaching Agent," Hydrometallurgy, 13:1, 63-72 (1984) (no month).

Dalton, et al., "The CUPREX Process—a new chloride-based hydrometallurgical process for the recovery of copper from sulphidic ores," 11 pages (1987) (no month).

Dannenberg, R.O., "Recovery of Cobalt and Copper from Complex Sulfide Concentrates," Government Report, 20 pages, Report No. BM RI 9138, U.S. Dept. of Interior (1987) (no month) (Abstract Only).

Dreisinger, D.B., et al., "The Total Pressure Oxidation of El Indio Ore and Concentrate," Copper 1999, vol. IV: Hydrometallurgy of Copper, pp. 181-195 (Oct. 1999).

Duyvesteyn, et al., "The Escondida Process for Copper Concentrates," The Paul E. Queneau International Symposium Extractive Metallurgy of Copper, Nickel, and Cobalt, vol. 1, Fundamental Aspects, pp. 881-885 (1998) (no month).

Evans, et al., International Symposium of Hydrometallurgy (Mar. 1, 1973) 2 pages.

Hackl, R.P., "Effect of Sulfur-Dispersing Surfactants on the Oxygen Pressure Leaching of Chalcopyrite," (paper from Copper 95) vol. III, 559-577, Met. Soc. Of CIM (Nov. 1995).

Hackl, R.P., "Passivation of Chalcopyrite During Oxidative Leaching in Sulfate Media," Hydrometallurgy 39; pp. 25-48 (1995) (no month).

Hirsch, H.E., "Leaching of Metal Sulphides," Patents UK No. 1,598,454, 7 pages (Sep. 23, 1981) (Abstract only).

King, Jim A., Autoclaving of Copper Concentrates (paper from Copper 95), vol. III, Electrorefining and Hydrometallurgy of Copper, Int'l Conference held in Santiago, Chile (Nov. 1995) (Abstract only).

King, Jim A., "The Total Pressure Oxidation of Copper Concentrates," the Paul E.Q. Int'l Symposium extractive Metallurgy of Copper, Nickel and Cobalt vol. I, Fundamental Aspects, Minerals, Metals & Materials Society, pp. 735-757 (Oct. 1993).

Mackiw, V.N., "Direct Acid Pressure Leaching of Chalcotite Concentrate", JOM 19:2, (Feb. 1967) (Abstract only).

Opposition to CL 1767-2001 by Anglo American PLC (with accompanying English translation of substantive assertions) (no date).

Richmond, G.D., "The Commissioning and Operation of a Copper Sulphide Pressure Oxidation Leach Process at Mt. Gordon, Alta Copper 1999: Copper Sulphides Symposium & Copper" Hydrometallurgy Forum (Gold Coast, Queensland, Australia Conference) (1999).

Ritcey, G.M., et al., "Solvent Extraction, Principles and Applications to Process Metallurgy, Part II", pp. 218-221 (1979) (no month).

Szymanowski, J., "Dydroxyoximes and Copper Hydrometallurgy," (CRC Press) 6 pages (no date).

Final Office Action dated Oct. 15, 2008 for U.S. Appl. No. 10/976,482.

PCT International Preliminary Examination Report for PCT/US01/23366 dated Oct. 23, 2002.

Non-Final Office Action dated Mar. 21, 2008 for U.S. Appl. No. 10/976,482.

PCT International Search Report for PCT/US02/23454 dated Jun. 12, 2003.

Written Opinion for PCT/US01/23468 dated Jul. 17, 2002.

PCT International Preliminary Examination Report for PCT/US01/23468 dated Dec. 17, 2002.

* cited by examiner

PROCESS FOR MULTIPLE STAGE DIRECT ELECTROWINNING OF COPPER

CROSS-REFERENCE TO RELATED APPLICATIONS

This application claims priority to U.S. patent application Ser. No. 11/163,761, entitled "Process for Multiple Stage Direct Electrowinning of Copper" filed on Oct. 28, 2005. The '761 application claims priority to U.S. Provisional Patent Application Ser. No. 60/623,199, entitled "Process for Multiple Stage Direct Electrowinning of Copper" filed Oct. 29, 2004. All these references are hereby incorporated by reference in their entirety.

FIELD OF THE INVENTION

The present invention relates generally to a process for recovering copper from a copper-containing ore, concentrate, or other copper-bearing material, and more specifically, to a process using super-fine grinding, a copper separation operation, and pressure leaching to produce cathode copper from a multiple-stage direct electrowinning process.

BACKGROUND OF THE INVENTION

Hydrometallurgical treatment of copper-containing materials, such as copper ores, concentrates, and other copper-bearing materials, has been well established for many years. Currently, there exist many creative approaches to the hydrometallurgical treatment of these materials; however, common to almost all of the processes either now known or under development is the use of solvent/solution extraction and electrowinning (SX-EW) operations for solution purification and copper recovery.

The traditional hydrometallurgical process for copper recovery involves first leaching copper-containing material with sulfuric acid solution, either atmospherically or under conditions of elevated temperature and pressure. The resultant liquid stream—the so-called pregnant leach solution—is collected and processed in a solvent/solution extraction stage, in which the leach solution is mixed with an organic solvent (i.e., an extractant mixed with a suitable diluent, such as kerosene). The organic phase selectively removes the copper from the pregnant leach solution. The copper-loaded organic phase is then mixed with an aqueous acid solution, which strips the copper from the extractant, producing a solution stream suitable for electrowinning. This resultant solution is highly concentrated in copper, is relatively pure, and typically is processed in an electrowinning circuit to yield high quality copper cathode.

Purification of copper from the pregnant leach solution by solvent/solution extraction has proven to be a successful means of providing a concentrated copper solution suitable for electrowinning of highly pure copper metal. Direct electrowinning of copper—that is, plating of copper directly from the pregnant leach solution without the intervening step of purification by solvent/solution extraction—is known. However, the copper recovered by such so-called direct electrowinning processes often is too impure for sale or use as is, and thus, generally must be further refined at an additional cost, or may be sold at a discount. More specifically, prior art techniques have shown the ability for direct electrowinning of copper to produce a relatively low-quality copper product.

An effective and efficient method to recover copper from metal-bearing materials, such as, for example, chalcopyrite, chalcocite, bornite, covellite, digenite, and enargite, that enables high copper recovery to be achieved at a reduced cost over conventional processing techniques would be advantageous.

SUMMARY OF THE INVENTION

While the way in which the present invention addresses the deficiencies and disadvantages of the prior art is described in greater detail hereinbelow, in general, according to various aspects of the present invention, a process for recovering copper and other metal values from a copper-containing material includes obtaining a copper-containing solution from, for example, a pressure leaching system, and then appropriately conditioning the copper-containing solution for electrowinning. In an exemplary aspect of the invention, the composition of the copper-containing solution is similar to the composition of the electrolyte produced by a solvent/solution extraction circuit, for example, with respect to acid and copper concentrations. In accordance with various embodiments of the present invention, however, the copper-containing solution is not subjected to solvent/solution extraction prior to electrowinning.

In accordance with an exemplary embodiment of the present invention, a process for recovering copper from a copper-containing material generally includes the steps of: (i) providing a feed stream containing copper-containing material; (ii) optionally, subjecting the copper-containing feed stream to a copper separation stage; (iii) subjecting the copper-containing feed stream to atmospheric leaching or pressure leaching to yield a copper-containing solution; (iv) conditioning the copper-containing solution through one or more chemical or physical conditioning steps; (v) electrowinning copper directly from the copper-containing solution, without subjecting the copper-containing solution to solvent/solution extraction; (vi) optionally, treating at least a portion of a lean electrolyte stream from the electrowinning step in a solvent/solution extraction and electrowinning operation; and (vii) recycling at least a portion of the lean electrolyte stream to the atmospheric or pressure leaching step to provide some or all of the acid requirement of the leaching operation.

In accordance with another exemplary embodiment of the present invention, a process for recovering copper from a copper-containing material generally includes the steps of: (i) providing a feed stream containing copper-containing material; (ii) optionally, subjecting the copper-containing feed stream to a copper separation stage; (iii) subjecting the copper-containing feed stream to atmospheric leaching or pressure leaching to yield a copper-containing solution; (iv) conditioning the copper-containing solution through one or more chemical or physical conditioning steps; (v) electrowinning copper directly from the copper-containing solution, without subjecting the copper-containing solution to solvent/solution extraction; (vi) optionally, treating at least a portion of a lean electrolyte stream from the electrowinning step in a solvent/solution extraction and electrowinning operation; and (vii) recycling at least a portion of the lean electrolyte stream to the atmospheric or pressure leaching step to provide some or all of the acid requirement of the leaching operation. As used herein, the term "pressure leaching" shall refer to a metal recovery process in which material is contacted with a liquid (e.g., an acidic solution, water, etc.) and oxygen under conditions of elevated temperature and pressure (i.e., above ambient).

In one optional aspect of an exemplary embodiment of the invention, one or more processing steps are used to separate copper from the acid in a recycled portion of the lean electrolyte from the direct electrowinning process, thus rejecting a portion of the acid and impurities from the process circuit without rejecting a significant portion of the copper. As discussed in greater detail hereinbelow, a number of conventional or hereafter devised processes may be utilized to separate copper from acid in the feed stream. For example, in accordance with one aspect of an exemplary embodiment of the invention, a copper precipitation step may be utilized to precipitate solubilized copper from a lean electrolyte stream onto the surfaces of solid particles in a copper-containing material (e.g., finely ground chalcopyrite) stream in advance of the pressure leaching step, thereby separating the copper from the acid solution.

In accordance with various exemplary aspects of the present invention, by providing for the electrowinning of copper directly from a copper-containing solution without first subjecting the copper-containing solution to solvent/solution extraction, the present invention enables lower-cost recovery of copper and reduces the expenses associated with solvent/solution extraction, such as expenses associated with reagents, process apparatus and equipment, and energy resources. Furthermore, in accordance with one exemplary aspect of the invention, careful control of the composition and the dispersion of the copper-containing solution entering the electrowinning circuit enables production of high quality, uniformly-plated cathode copper. However, in accordance with still other aspects of the present invention, one or more process "bleed" streams may be subjected to solvent/solution extraction or treatment in one or more liberator cells or other similar processes, preferably following the electrowinning of copper therefrom.

These and other advantages of a process according to various aspects and embodiments of the present invention will be apparent to those skilled in the art upon reading and understanding the following detailed description with reference to the accompanying figures.

BRIEF DESCRIPTION OF THE DRAWINGS

The subject matter of the present invention is particularly pointed out and distinctly claimed in the concluding portion of the specification. A more complete understanding of the present invention, however, may best be obtained by referring to the detailed description when considered in connection with the drawing figures, wherein like numerals denote like elements and wherein:

DETAILED DESCRIPTION

Figure 1:
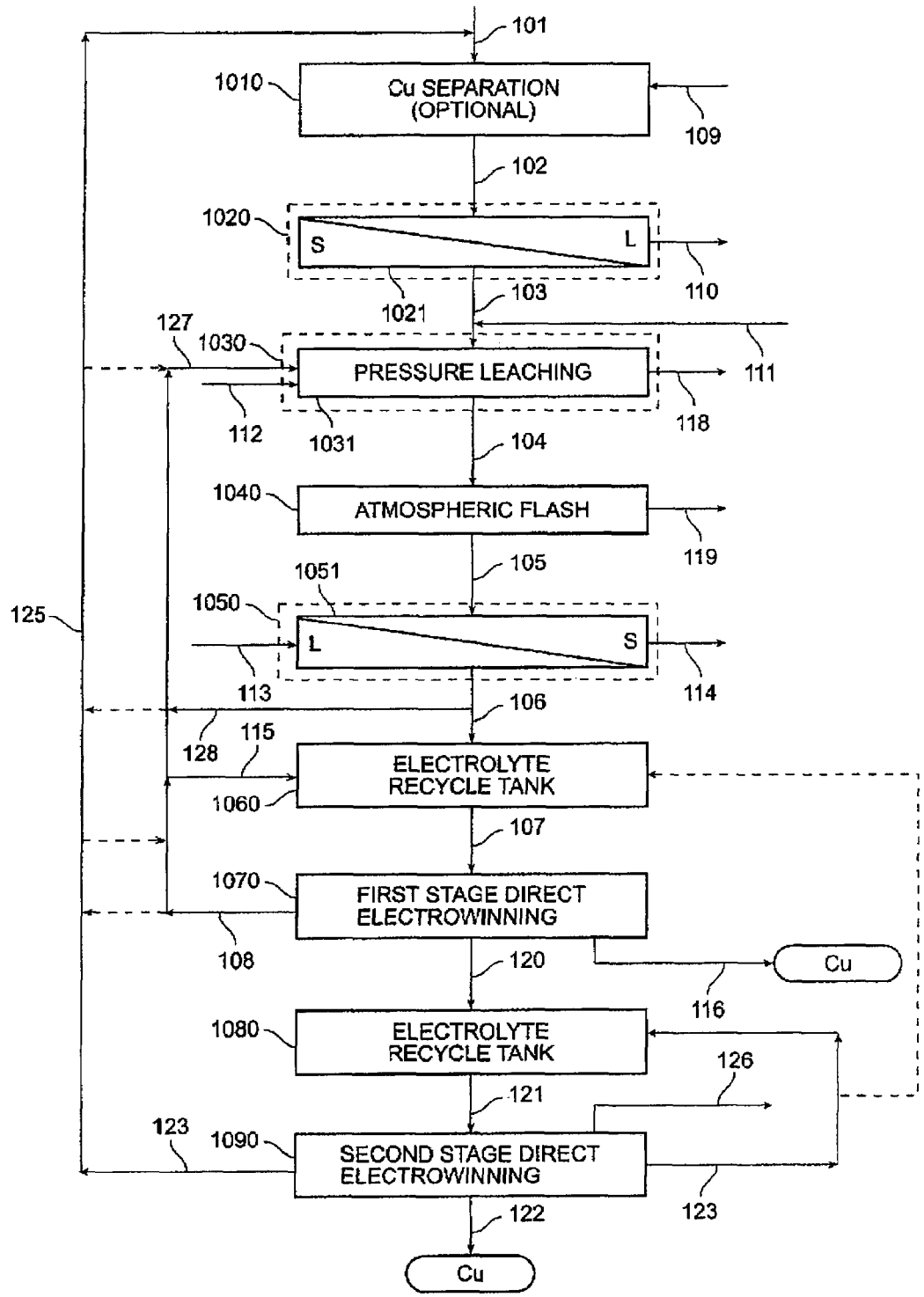
FIG. 1 illustrates a flow diagram of a copper recovery process in accordance with an exemplary embodiment of the present invention.

The present invention exhibits significant advancements over prior art processes, especially other so-called "direct electrowinning" processes, particularly with regard to product quality and process efficiency. Moreover, existing copper recovery processes that use a conventional atmospheric or pressure leaching, solvent/solution extraction, and electrowinning process sequence may, in many instances, be easily retrofitted to exploit the many commercial benefits the present invention provides.

In one optional aspect of an exemplary embodiment of the invention, at least a portion of the acid generated during the electrowinning stage as a copper-containing electrolyte stream is transported out of the copper recovery process after an optional separation step in which substantially all of the copper is removed from the copper-containing electrolyte stream. It is generally economically advantageous to utilize this generated acid in some way, rather than to attenuate or dispose of it. Thus, as discussed in greater detail hereinbelow, embodiments of the present invention incorporating these optional aspects may find particular utility in combination with conventional atmospheric leaching operations, such as, for example, heap leaching, vat leaching, dump or stockpile leaching, pad leaching, agitated tank leaching, and bacterial leaching operations, which often require a substantially continuous acid supply.

In accordance with one aspect of an exemplary embodiment of the present invention, a feed stream containing copper-containing material is provided for processing. In accordance with various embodiments of present invention, the copper-containing material may be an ore, a concentrate, or any other copper-bearing material from which copper and/or other metal values may be recovered. The copper in the copper-containing material may be in the form of copper oxides, copper sulfides, and/or other copper minerals, and the copper-containing material may include any number of a variety of other metals, such as, for example, gold, platinum group metals, silver, zinc, nickel, cobalt, molybdenum, rare earth metals, rhenium, uranium and mixtures thereof. Various aspects and embodiments of the present invention prove especially advantageous in connection with the recovery of copper from copper-bearing sulfide ores, such as, for example, chalcopyrite ($CuFeS_2$), chalcocite ($Cu_2S$), bornite ($Cu_5FeS_4$), covellite (CuS), enargite ($Cu_3AsS_4$), digenite ($Cu_9S_5$), and/or mixtures thereof.

In accordance with an exemplary embodiment of the present invention, copper is the metal to be recovered from a metal-bearing material, such as a copper sulfide concentrate. One aspect of this exemplary embodiment involves use of a copper sulfide concentrate produced by froth flotation. In preparation for froth flotation, the metal-bearing material feed stream is ground to a particle size suitable to liberate mineral-bearing particles from gangue materials. However, as noted above, other concentrates may also be utilized.

Metal-bearing material 101 may be prepared for metal recovery processing in any manner that enables the conditions of metal-bearing material 101 to be suitable for the chosen processing method, as such conditions may affect the overall effectiveness and efficiency of processing operations. For example, feed stream conditions such as particle size, composition, and component concentrations can affect the overall effectiveness and efficiency of downstream processing operations, such as, for example, atmospheric leaching or pressure leaching. Desired composition and component concentration parameters can be achieved through a variety of chemical and/or physical processing stages, the choice of which will depend upon the operating parameters of the chosen processing scheme, equipment cost and material specifications.

In accordance with an exemplary aspect of the invention, the particle size of the copper-containing feed material is reduced to optimize the processing steps of atmospheric or pressure leaching and subsequent metal recovery processes. A variety of acceptable techniques and devices for reducing the particle size of the copper-containing material are currently available, such as ball mills, tower mills, superfine grinding mills, attrition mills, stirred mills, horizontal mills and the like, and additional techniques may later be developed that may achieve the desired result of increasing the surface area of the material to be processed. With regard to one aspect of an exemplary embodiment of the invention, such a result is desired because the reaction rate during precipitation and/or leaching may increase as the surface area of the copper-containing material increases.

In accordance with one aspect of an exemplary embodiment of the invention, satisfactory grinding of chalcopyrite concentrate with an as-received particle size of approximately 98 percent passing about 172 microns may be achieved using a grinding apparatus such as, for example, a stirred horizontal shaft mill with baffles or a vertically stirred mill without baffles. Exemplary apparatus include the Isamill developed jointly by Mount Isa Mines (MIM), Australia, and Netzsch Feinmahltechnik, Germany and the SMD or Detritor mill, manufactured by Metso Minerals, Finland. Preferably, if a horizontal mill is utilized, the grinding medium would be 1.2/2.4 mm or 2.4/4.8 mm Colorado sand, available from Oglebay Norton Industrial Sands Inc., Colorado Springs, Colo. However, any grinding medium that enables the desired particle size distribution to be achieved may be used, the type and size of which may be dependent upon the application chosen, the product size desired, grinding apparatus manufacturer's specifications, and the like. Exemplary media include, for example, sand, silica, metal beads, ceramic beads, and ceramic balls.

In another optional aspect of an exemplary embodiment of the present invention, all or part of the metal-bearing material feed stream may be combined with a liquid prior to entering optional copper separation stage 1010 (described hereinbelow) or copper leaching stage 1030. Preferably, the liquid comprises water, but any suitable liquid may be employed, such as, for example, raffinate, pregnant leach solution, or lean electrolyte. For example, a portion of lean electrolyte stream 125 from the direct electrowinning process may be combined with metal-bearing material to form metal-bearing material feed stream 101.

The optional combination of a liquid with the metal-bearing material can be accomplished using any one or more of a variety of techniques and apparatus, such as, for example, in-line blending or using a mixing tank or other suitable vessel. In accordance with an exemplary aspect of an embodiment of the invention, the concentration of solid metal-bearing material in the material stream (i.e., the slurry density) is on the order of less than about fifty (50) percent by weight of the stream, and preferably about forty, (40) percent by weight of the stream. Other slurry densities that are suitable for transport and subsequent processing may, however, be used.

In accordance with another optional aspect of an exemplary embodiment of the present invention, at least a portion of the copper in a recycled stream of lean electrolyte from electrowinning is separated from the acid in the stream, thereby reducing the amount of impurities in the portion of the stream to be subjected to the metal recovery process. In such a separation process, the acid that is removed from the recycled lean electrolyte stream may be rejected from the process circuit, taking with it at least a portion of the solid or soluble impurities from the copper-containing feed stream and the recycled lean electrolyte stream. Any number of conventional or hereafter devised separation processes and techniques may be useful to achieve the separation of copper from acid in the lean electrolyte stream. For example, separation processes and/or techniques such as precipitation, low temperature pressure leaching, acid solvent/solution extraction/ ion exchange, membrane separation, cementation, pressure reduction, sulfiding, and/or the use of liberator cells may be useful for this purpose.

The optional separation aspect of an exemplary embodiment of the invention contributes to providing a resultant acid stream from copper separation step 1010 that contains a relatively small fraction of copper, which can be used for leaching, pH control, and/or other applications. Moreover, utilization of a separation process may advantageously enable removal of certain impurities. For example, because the resultant acid stream is preferably removed from the metal recovery process and utilized in remote operations, disposed of, or attenuated, the impurities contained therein are likewise removed from the metal recovery process and are thus prevented from accumulating in the process stream. This may be a significant advantage in that such impurities, particularly metal impurities, typically have a deleterious effect on the effectiveness and efficiency of the desired metal recovery process. For example, metal impurities and other impurities in the process stream, if not carefully controlled and/or minimized, can contribute to diminished physical and/or chemical properties in the cathode copper produced by electrowinning, and can thus degrade the copper product and diminish its economic value.

Referring again to FIG. 1, in accordance with one optional aspect of an exemplary embodiment of the invention, copper-containing material stream 101 is subjected to a separation step, such as, for example, a precipitation step, which, in this exemplary process, serves to precipitate solubilized copper from a recycled lean electrolyte stream. As discussed in detail above, this aspect offers an important advantage in that it enables recovery of copper from a lean electrolyte stream that otherwise may have been lost or would have required additional processing to recover, potentially resulting in significant economic benefits.

In accordance with an exemplary embodiment of the invention, an optional precipitation step involves copper-containing material stream 101 being combined with a lean electrolyte stream 125 and, optionally, a sulfur dioxide (SO2) stream 109 in a suitable processing vessel. For example, in the embodiment illustrated in FIG. 1, lean electrolyte stream 125 may comprise a recycled acidic copper sulfate stream generated during an electrowinning operation. Other streams, however, preferably acidic streams, may also be used. While the use of such other streams will be described in greater detail hereinbelow, in accordance with various aspects of the present invention, processing streams, preferably from electrowinning operations, may be used. For example, in the embodiments illustrated in FIGS. 1 and 3, multiple stage electrowinning follows pressure leaching. While two such electrowinning stages are illustrated, it will be appreciated that additional stages may also be utilized in various applications. However, lean electrolyte from either the first or second electrowinning stage may be used as the recycled electrolyte used in optional copper separation step 1010. Preferably, however, and as is illustrated best in FIG. 3, a stream 123 from the second electrowinning circuit 1090 is recycled to copper separation step 1010. In one aspect of an embodiment of the invention, lean electrolyte stream 125 has an acid concentration of from about 20 to about 200 grams/liter, preferably from about 70 to about 180 grams/liter, and most preferably from about 140 to about 170 grams/liter. In a further aspect of this embodiment of the invention, lean electrolyte stream 125 has a copper concentration of from about 20 to about 55 grams/liter, preferably from about 25 to about 50 grams/liter, and most preferably from about 30 to about 45 grams/liter. If utilized, in copper precipitation stage 1010, copper from lean electrolyte stream 125 precipitates to form a desired copper-rich concentrate. Preferably, when used, precipitation is carried out such that the copper from the lean electrolyte precipitates, at least in part, in the form of a copper sulfide, such as, for example, CuS. While not wishing to be bound by any particular theory, the chemical reaction during this exemplary copper precipitation step—wherein, for example, the copper-containing material is primarily chalcopyrite—is believed to be as follows:

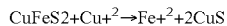

$$CuFeS_2+Cu^{+2} \rightarrow Fe^{+2}+2CuS$$

Other copper minerals and other sulfides react to varying degrees according to similar reactions, producing copper precipitates and a weak sulfuric acid by-product. In accordance with an optional aspect of the invention, copper separation stage 1010 is carried out at a slightly elevated temperature, such as from about 70° C. to about 180° C., preferably from about 80° C. to about 100° C., and most preferably at a temperature of about 90° C. Heating, if necessary, can be effectuated through any conventional means, such as with steam, electric heating coils, a heat blanket, process fluid heat exchange, and other ways now known or later developed. In the exemplary process of FIG. 1, steam generated in other process areas, such as stream 119 from flash tank 1040 or stream 118 from pressure leaching stage 1030, may be directed to the processing vessel in copper separation stage 1010 to provide the heat desired to enhance the precipitation process.

The residence time for the optional copper separation process can vary, depending on factors such as the operating temperature of the processing vessel and the size distribution/surface area of the composition of the copper-containing material, but typically ranges from about two (2) minutes to about six (6) hours. Preferably, conditions are selected such that significant amounts of copper are precipitated. For example, precipitation rates on the order of about 98% precipitation of copper have been achieved in processing vessels maintained at about 90° C. for about 4 hours.

Other parameters to consider when conditioning the copper-containing material feed stream for processing are (i) the ratio of solid particles in the feed stream to the total volume of the copper-containing solution feed stream; (ii) the ratio of copper in solution to copper-containing material; (iii) temperature; (iv) pressure; (v) viscosity; (vi) slurry density of the feed stream; and (vii) other factors may be suitably addressed. Although these parameters may or may not be significant to the overall efficiency of processing operations downstream in all cases, these parameters can affect equipment size and material specifications, energy requirements, and other important aspects of process design. Thus, calculated adjustment of these stream parameters in advance of complex or resource-intensive processing stages can positively affect the economic efficiency of the chosen process. Solid-liquid separation systems, such as, for example, filtration systems, counter-current decantation (CCD) circuits, thickeners, and the like are useful in adjusting these parameters and are widely used in the industry.

In one aspect of the embodiment of the invention illustrated in FIG. 1, product stream 102, which generally contains covellite/chalcopyrite particles and acid, contains acid generated in pressure leaching stage 1030, first electrowinning stage 1070, and second electrowinning stage 1090, and any acid generated in optional copper separation stage 1010 as a result of SO2.

In accordance with an exemplary aspect of the invention, the copper-containing material stream entering the pressure leaching stage contains from about 10 and about 50 percent solids by weight, preferably from about 20 to about 40 percent solids by weight. To adjust the solids concentration of product stream 102 in accordance with the desired parameters and to separate the acid-bearing solution from the copper-containing solids, in accordance with an exemplary embodiment of the invention, product stream 102 is sent to a solid-liquid separation circuit 1020. In one aspect of an exemplary embodiment of the invention, solid-liquid separation circuit 1020 preferably includes a thickener circuit 1021 comprising at least one thickener that will effectuate solid-liquid separation. In the illustrated embodiment, the underflow of thickener circuit 1021 is pressure leaching feed stream 103 and the overflow is acid stream 110. Preferably, acid stream 110 contains only a negligible amount of copper.

Process effluent acid stream 110 may be utilized, processed, attenuated, impounded, and/or disposed of in a variety of ways, the appropriate choice of which is largely dependent upon economic and regulatory factors. In one aspect of the illustrated embodiment, the acid stream can be beneficially used in, for example, a leaching operation, such as an atmospheric leaching operation, where acid is required to leach copper oxide, copper sulfide, or other metal oxide/sulfur minerals. Such a leaching operation may be a heap leach, a vat leach, a tank leach, a pad leach, or any other similar operation or may be a medium or low-temperature pressure leaching operation. Acid is consumed in these operations through reaction with acid-consuming constituents in the ore.

Figure 2:
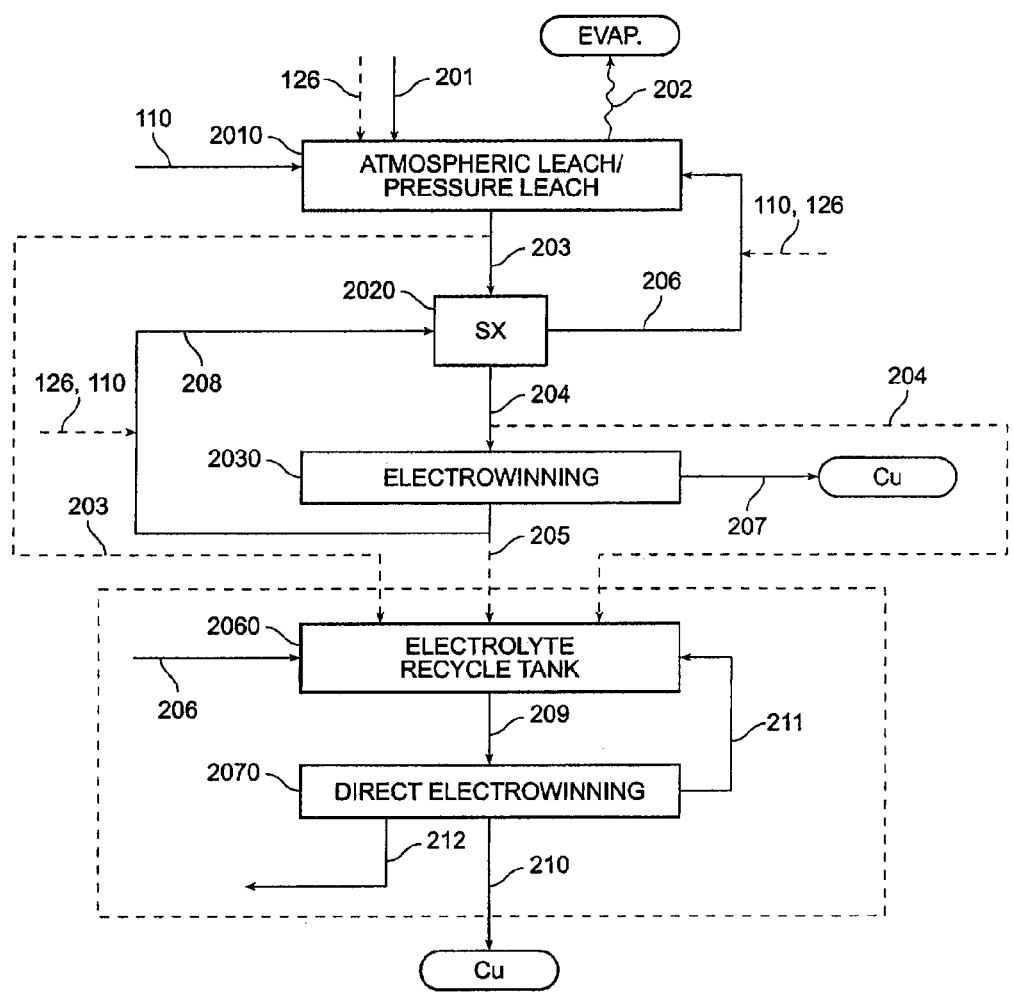
FIG. 2 illustrates a flow diagram of various aspects of a copper recovery process in accordance with an alternative embodiment of the present invention; and, FIG. 3 illustrates a flow diagram of a copper recovery process in accordance with an alternative embodiment of the present invention.

In FIG. 2, acid stream 110 from thickener circuit 1021 (FIG. 1) is sent to an atmospheric pressure leach operation 2010. In accordance with one aspect of an exemplary embodiment of the invention, leach operation 2010 is a conventional acid-consuming heap leach operation, wherein a copper ore 201 is contacted with acid stream 110 and, optionally, other process streams, such as raffinate stream 206 from downstream solvent/solution extraction unit 2020. In the example of leach operation 2010 as a heap leach operation, the acid percolates downward through the ore heap, solubilizing the copper in the copper-containing ore in the form of copper sulfate, to form a copper-rich pregnant leach solution (PLS) stream 203. In the example of leach operation 2010 as a pressure leach operation, acid aids in the solubilization of copper in the feed material to form a PLS stream. PLS stream 203 is sent to a solvent/solution extraction unit, such as solvent/solution extraction unit 2020 in FIG. 2, to produce a high concentration and relatively pure copper sulfate solution suitable for electrowinning of copper. In accordance with an alternative aspect of the present invention illustrated in FIG. 2, PLS stream 203 may not be subjected to solvent/solution extraction, but may instead be blended with other copper-containing process streams, and the resultant stream then sent to a copper electrowinning circuit. For example, all or a portion of PLS stream 203 (broken line) may be blended with copper-containing solution stream 106 and lean electrolyte stream 115 in electrolyte recycle tank 1060 (from FIG. 1) to form a resultant product stream suitable for copper electrowinning in an electrowinning circuit.

If effluent acid stream 110 is not used as an acid-containing by-product or otherwise utilized, the acid may be attenuated using, for example, acid-consuming gangue (i.e., mineral processing tailings) or an attenuating agent, such as limestone or lime. Attenuating with acid-consuming gangue can be relatively inexpensive, as the attenuating reagent is essentially free. On the other hand, attenuating with limestone or lime may be less desirable economically, as both these reagents will incur cost. Nevertheless, should attenuation be desired, any method for acid attenuation now known or hereafter devised may be employed.

In accordance with a further aspect of this embodiment of the present invention, as previously briefly mentioned, acid stream 110 advantageously may remove impurities from the process, for example, the electrowinning process. Such impurities include, without limitation, iron, aluminum, manganese, magnesium, sodium, potassium, and other metal ions, often present as sulfates. In the absence of removal, such impurities may accumulate to deleterious levels, and, as such negatively impact production efficiencies and product (i.e., copper cathode) quality. The presence of such impurities in acid stream 110 generally does not negatively impact the aforementioned handling of acid stream 110. [Para 41] In accordance with one aspect of an exemplary embodiment of the invention illustrated in FIG. 2, solvent/solution extraction unit 2020 purifies copper-bearing PLS stream 203 from the heap leach in two unit operations—an extraction operation, which may have multiple stages, followed by a stripping operation. In the extraction stage, PLS stream 203 is contacted with an organic phase consisting of a diluent (e.g., kerosene) in which a copper selective extractant reagent (i.e., the extractant) is dissolved. When the solutions are contacted, the organic extractant chemically removes the copper from the PLS, forming an aqueous raffinate stream. The raffinate and organic streams are subsequently separated in a settler. After separation of the organic and aqueous phases in the settler, a portion of the aqueous phase (stream 206) is typically returned to one or more leaching operations to be reloaded with copper from the ore in the atmospheric leaching step 2010 to form the PLS. Optionally, a portion of raffinate stream 206 may be recycled to copper separation step 1010. The organic stream passes on to the second unit operation of the solvent/solution extraction process, the stripping operation. In the stripping operation, the organic stream is contacted with a strongly acidic electrolyte. This acidic solution "strips" the copper from the extractant, leaving the organic phase substantially depleted of copper. At least a portion of the loaded strip solution aqueous phase (stream 204) is advanced to an electrowinning plant 2030 as a copper "rich" solution. Aqueous stream 204 is processed in electrowinning plant 2030 to yield cathode copper 207 and a copper-containing lean electrolyte stream 208, which, in one aspect of an exemplary embodiment of the invention, may be recycled in part to solvent/solution extraction unit 2020.

In accordance with one alternative aspect of the invention, aqueous stream 204 may not be subjected to electrowinning immediately after leaving the solvent/solution extraction unit, but may instead be blended with other copper-containing process streams, and the resultant stream then sent to an electrowinning circuit. For example, all or a portion of aqueous stream 204 (broken line) may be blended with copper-containing solution stream 106 and lean electrolyte stream 115 in electrolyte recycle tank 1060 (from FIG. 1) to form a resultant product stream suitable for electrowinning in an electrowinning circuit 1070. In such cases the stripping solutions used in solvent/solution extraction 2020 likely will be comprised of spent electrolyte from electrowinning circuit 1070.

Referring again to FIG. 1, the underflow slurry from thickener circuit 1021, pressure leaching feed stream 103 in this preferred embodiment of the invention, has a composition of about 40 to about 60 percent solids by weight, the balance being a dilute acid solution. The general composition of the dilute acid solution is dependent upon the ratio of process water to acid introduced in the thickener circuit.

In a further aspect of the present invention, the conditioned copper-containing feed stream preferably is subjected to a suitable process, such as pressure leaching, to produce product slurry 104, which comprises a copper-containing solution 106 and a residue 114. The process may be selected as desired, but, in general, enables production of a copper-containing solution 106 that exhibits copper and acid concentrations similar to an electrolyte stream resulting from a solvent/solution extraction circuit—that is, the copper-containing solution preferably is suitable for processing in an electrowinning circuit. Any suitable technique or combination of techniques that yields an appropriate copper-containing solution without employing solvent/solution extraction techniques may be used. In an exemplary embodiment of the invention, as illustrated in FIG. 1, pressure leaching feed stream 103 is subjected to a pressure leaching stage 1030 to yield copper-containing product slurry 104.

In accordance with one aspect of this embodiment of the present invention, pressure leaching feed stream 103 is transported to a suitable vessel for pressure leaching, which can be any vessel suitably designed to contain the process components at the desired temperature and pressure conditions for the requisite processing residence time. In an exemplary embodiment, a pressure leaching vessel 1031 is employed for this purpose. Pressure leaching vessel 1031 is preferably a horizontal multi-compartment, agitated vessel; however, other vessel configuration and agitation alternatives now known or hereafter devised may be employed. It should be appreciated that any pressure leaching vessel that suitably permits pressure leaching feed stream 103 to be prepared for copper recovery may be utilized within the scope of the present invention.

Generally, the chemical conversions that occur during pressure leaching stage 1030 under certain conditions for the solubilization of the copper in copper-containing materials, such as chalcopyrite, chalcocite, or covellite are as follows:

4CuFeS2+17O2+4H2O->4CuSO4+4H2SO4+2Fe2O3

2Cu2S+5O2+2H2SO4->4CuSO4+2H2O

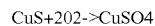

CuS+2O2->CuSO4

If desired, conditions during pressure leaching can be controlled such that a portion of the sulfide sulfur contained in the feed stream is converted to elemental sulfur instead of sulfate. The fraction of chalcopyrite and covellite that form sulfur instead of sulfate are believed to react according to the following reactions:

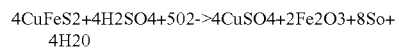

4CuFeS2+4H2SO4+5O2->4CuSO4+2Fe2O3+8So+ 4H2O

2CuS+2H2SO4+O2->2Cu$^{+2}$+2SO4$^{-2}$+2H2O+2So

Pressure leaching, for example in pressure leaching vessel 1031, preferably occurs in a manner suitably selected to promote the solubilization of copper using these (or other) processes. In general, temperature and pressure in the pressure leaching vessel should be carefully controlled. For example, in accordance with one aspect of the invention, the temperature of pressure leaching vessel 1031 is maintained at from about 100° C. to about 250° C., preferably from about 140° C. to about 235° C. In accordance with one aspect of one embodiment of the invention, the temperature of pressure leaching vessel 1031 is advantageously maintained at from about 140° C. to about 180° C. or in the range of from about 150° C. to about 175° C. In accordance with another embodiment of the invention, the temperature of pressure leaching vessel 1031 is advantageously maintained between from about 200° C. to about 235° C. or in the range of from about 210° C. to about 225° C.

In accordance with one aspect of the present invention, during pressure leaching in pressure leaching vessel 1031, sufficient oxygen 112 is injected into the vessel to maintain an oxygen partial pressure from about 50 to about 250 psig, preferably from about 75 to about 220 psig, and most preferably from about 150 to about 200 psig. Furthermore, due to the nature of medium temperature pressure leaching, the total operating pressure (including oxygen partial pressure and steam pressure) in the pressure leaching vessel is generally superatmospheric, preferably from about 100 to about 750 psig, more preferably from about 250 to about 400 psig, and most preferably from about 270 to about 350 psig.

Figure 3:
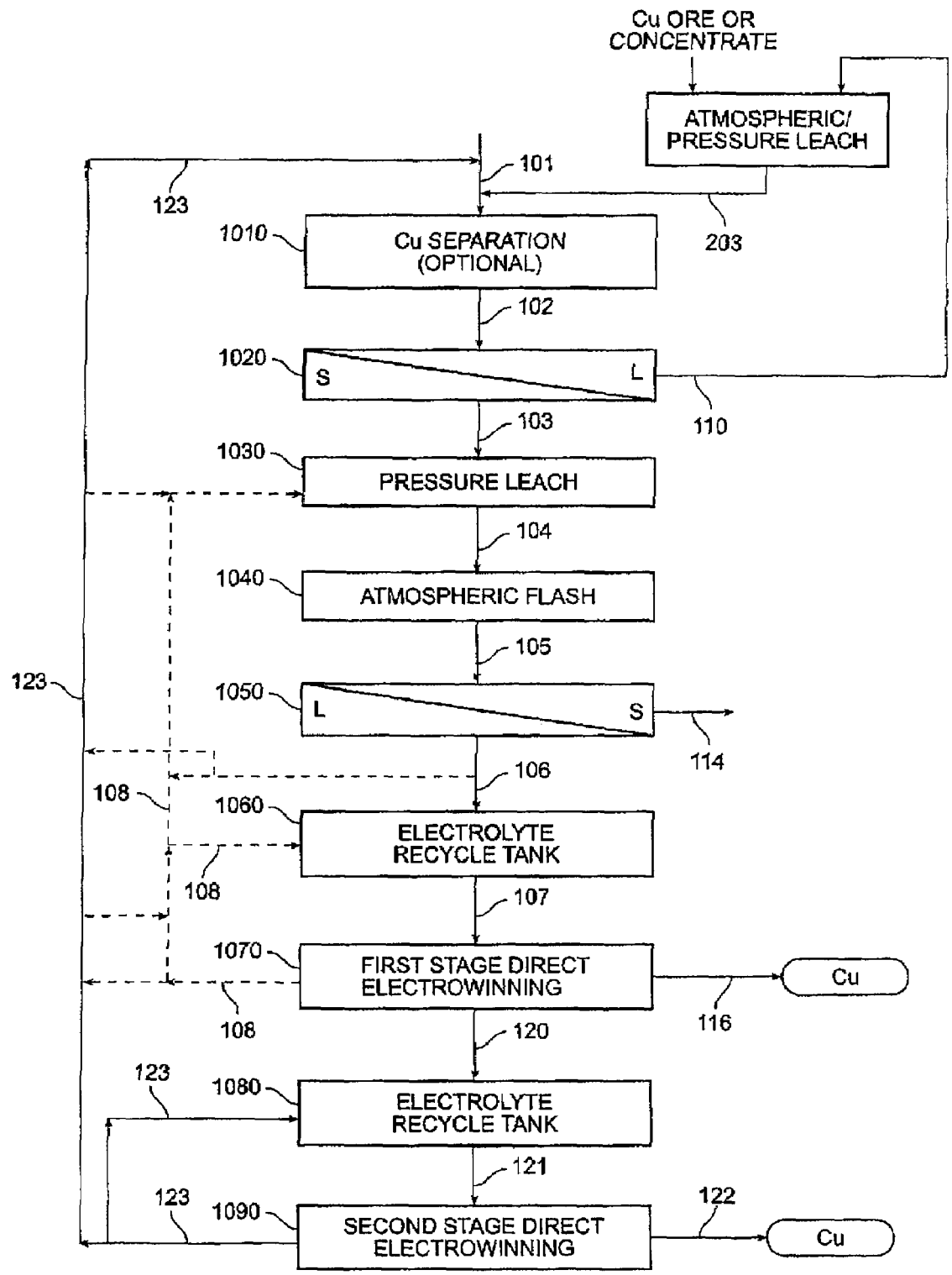

Because pressure leaching of many metal sulfides is a highly exothermic process and the heat generated is generally greater than that required to heat pressure leaching feed stream 103 to the desired operating temperature, cooling liquid 111 is preferably contacted with pressure leaching feed stream 103 in pressure leaching vessel 1031 during pressure leaching. Cooling liquid 111 is preferably process water, but can be any suitable cooling fluid from within the refining process or from an outside source. In an exemplary embodiment of the invention, a sufficient amount of cooling liquid 111 is added to pressure leaching vessel 1031 to yield a solids content in the product slurry 104 ranging from about 3 to about 15 percent solids by weight. In accordance with one aspect of the present invention, and with momentary reference to FIG. 3, cooling of the pressure leaching vessel can be accomplished by recycling lean electrolyte 123 from one or more of the subsequent electrowinning stages. For example, as illustrated in FIG. 3, preferably a lean electrolyte stream 108 is directed from the first electrowinning circuit 1070 to pressure leaching step 1031.

The residence time for pressure leaching generally depends on a number of factors, including the composition of the copper-containing feed stream, its particle size, and the operating pressure and temperature of the pressure leaching vessel. In one aspect of an exemplary embodiment of the invention, the residence time for the pressure leaching of chalcopyrite ranges from about 30 to about 180 minutes, more preferably from about 60 to about 150 minutes, and most preferably on the order of about 80 to about 120 minutes.

In accordance with an exemplary aspect of the present invention, medium temperature pressure leaching of stream 103 is performed in the presence of a dispersing agent 127. Suitable dispersing agents useful in accordance with this aspect of the present invention include, for example, organic compounds such as lignin derivatives, such as, for example, calcium and sodium lignosulfonates, tannin compounds, such as, for example, quebracho, orthophenylene diamine (OPD), alkyl sulfonates, such as, for example, sodium alkylbenzene sulfonates, and combinations of the above. Dispersing agent 127 may be any compound that resists degradation in the temperature range of medium temperature pressure leaching (i.e., from about 140° C. to about 180° C.) long enough to disperse the elemental sulfur produced during the medium temperature pressure leaching process and that achieves the desired result of preventing elemental sulfur from passivating copper values, which may reduce copper extraction. Dispersing agent 127 may be introduced to the pressure leaching vessel in an amount and/or at a concentration sufficient to achieve the desired result. In one aspect of an exemplary embodiment of the invention, favorable results are achievable during pressure leaching of chalcopyrite using calcium lignosulfonate in an amount of about 2 to about 20 kilograms per tonne, and more preferably in an amount of about 4 to about 12 kilograms per tonne; and more preferably in an amount of about 6 to about 10 kilograms per tonne of chalcopyrite concentrate.

In another aspect of the present invention, the copper-containing solution is conditioned for electrowinning through one or more chemical and/or physical processing steps. In much the same way that the copper-containing material feed stream is conditioned for processing in accordance with above-described aspects of the invention, the copper-containing solution intended to be utilized in the electrowinning circuit of the present invention is conditioned to adjust the composition, component concentrations, volume, temperature, and/or other physical and/or chemical parameters to desired values. Generally, a properly conditioned copper-containing solution will contain a relatively high concentration of copper in an acid solution and will contain relatively few impurities. Preferably, the conditions of copper-containing solution entering the electrowinning circuit are kept at a constant level to enhance the quality and uniformity of the cathode copper product.

In an exemplary aspect of the invention, conditioning of a copper-containing solution for electrowinning begins by adjusting certain physical parameters of the product slurry from the previous processing step. In an exemplary embodiment of the invention wherein the previous processing step is pressure leaching, it is desirable to reduce the temperature and pressure of the product slurry. An exemplary method of so adjusting the temperature and pressure characteristics of the preferred product slurry is atmospheric flashing.

Thus, in accordance with an exemplary aspect of the embodiment illustrated in FIG. 1, product slurry 104 from pressure leaching vessel 1031 is flashed in an atmospheric flash tank 1040 or other suitable atmospheric system to release pressure and to evaporatively cool the product slurry 104 through the release of steam to form a flashed product slurry 105. Flashed product slurry 105 preferably has a temperature ranging from about 90° C. to about 101° C., a copper concentration of from about 40 to about 120 grams/liter, and an acid concentration of from about 10 to about 60 grams/liter. In one aspect of the invention, however, flashed product slurry 105 also contains a particulate solid residue containing, for example, the iron oxide by-product of pressure leaching, elemental sulfur, precious metals and other components that are undesirable for a feed stream to an electrowinning circuit. Thus, in accordance with the same principles discussed above, it is desirable to subject the flashed product slurry to a solid-liquid separation process, such that the liquid portion of the slurry—the desired copper-containing solution—preferably is separated from the solid portion of the slurry, which may be subjected to further processing.

Referring again to FIG. 1, in the illustrated embodiment of the invention flashed product slurry 105 is directed to a solid-liquid separation stage 1050, such as a CCD circuit 1051. In an alternative embodiment of the invention, solid-liquid separation stage 1050 may comprise, for example, a thickener or a filter. A variety of factors, such as the process material balance, environmental regulations, residue composition, economic considerations, and the like, may affect the decision whether to employ a CCD circuit, a thickener, a filter, or other suitable device in solid-liquid separation stage 1050. In one aspect of an exemplary embodiment of the invention, CCD circuit 1051 uses conventional countercurrent washing of the residue stream with wash water 113 to recover leached copper to the copper-containing solution product and to minimize the amount of soluble copper advancing to either precious metal recovery processes or residue disposal. Preferably, large wash ratios are used to enhance the effectiveness of solid-liquid separation stage 1050—that is, relatively large amounts of wash water 113 are added to the residue in CCD circuit 1051. Preferably, the solution portion of the residue slurry stream is diluted by wash water 113 in CCD circuit 1051 to a copper concentration of from about 5 to about 200 parts per million (ppm) in the solution portion of residue stream 114. In accordance with one aspect of an exemplary embodiment of the invention, addition of a chemical reagent to solid-liquid separation stage 1050 may be desirable to remove deleterious constituents from the process stream. For example, a polyethylene oxide may be added to effectuate removal of silica by precipitation, or other flocculants and/or coagulants might be utilized to remove other undesirable species from the process stream. One such suitable chemical reagent is POLYOXTM WSR-301, available from Dow Chemical.

Depending on its composition, residue stream 114 from solid-liquid separation stage 1050 may be impounded, disposed of, or subjected to further processing, such as, for example, precious metal recovery. For example, if residue stream 114 contains economically significant amounts of gold, silver, and/or other precious metals, it may be desirable to recover this gold fraction through a cyanidation process or other suitable recovery process now known or hereafter devised. If gold or other precious metals are to be recovered from residue stream 114 by cyanidation techniques, the content of impurities in the stream, such as elemental sulfur, iron precipitates, unreacted copper minerals, acid, and soluble copper and soluble impurities, is preferably minimized. Such materials may promote high reagent consumption in the cyanidation process and thus increase the expense of the precious metal recovery operation. As mentioned above, it is therefore preferable to use a large amount of wash water or other diluent during the solid-liquid separation process to maintain low copper and acid levels in the solids-containing residue stream in an attempt to optimize the conditions for subsequent precious metal recovery. As previously noted, careful control of the conditions of a copper-containing solution entering an electrowinning circuit—especially maintenance of a substantially constant copper composition—can enhance the quality of the electrowon copper by, among other things, enabling even plating of copper on the cathode and avoidance of surface porosity in the cathode copper, which degrades the copper product and thus may diminish its economic value. In accordance with this aspect of the invention, such process control can be accomplished using any of a variety of techniques and equipment configurations, so long as the chosen system and/or method maintains a sufficiently constant feed stream to the electrowinning circuit.

Referring again to FIG. 1, in an exemplary aspect of the invention, copper-containing solution stream circuit 106 from solid-liquid separation stage 1050 is sent to an electrolyte recycle tank 1060. Electrolyte recycle tank 1060 suitably facilitates process control for first electrowinning circuit 1070, as will be discussed in greater detail below. Copper-containing solution stream 106, which generally contains from about 40 to about 120 grams/liter of copper and from about 10 to about 60 grams/liter acid, is preferably blended with a lean electrolyte stream 11 5 in electrolyte recycle tank 1060 at a ratio suitable to yield a product stream 107, the conditions of which may be controlled to optimize the resultant product of first electrowinning circuit 1070.

Referring briefly to an alternative embodiment of the invention illustrated in FIG. 2, an additional lean electrolyte stream 205 may be blended with lean electrolyte stream 115 and copper-containing solution stream 106 in electrolyte recycle tank 1060 to produce product stream 107 in accordance with the process control principles discussed in connection with the embodiment illustrated in FIG. 1. In one aspect of this alternative embodiment, lean electrolyte stream 205 preferably has a composition similar to that of lean electrolyte stream 115. Further, as discussed above, other streams may be introduced to electrolyte recycle tank 1060 for blending, such as, for example, PLS stream 203 (FIG. 2) or a portion of lean electrolyte stream 123 from second electrowinning circuit 1090 (FIG. 3).

Referring again to FIG. 1, preferably, the copper composition of product stream 107 is maintained substantially constant. While product stream 107 may contain a copper concentration up to the copper solubility limit under the prevailing conditions, preferably product stream 107 has a copper concentration of about 15 to about 80 grams/liter, and more preferably of about 20 to about 60 grams/liter, and often above 30 grams/liter. In one aspect of an exemplary embodiment of the invention, control valves are positioned on each of the pipelines feeding lean electrolyte stream 115 and copper-containing solution stream 106 to electrolyte recycle tank 1060 to facilitate blending control within the tank. With reference to FIG. 1, copper from the product stream 107 is suitably electrowon to yield a pure, cathode copper product. In accordance with various aspects of the invention, a process is provided wherein, upon proper conditioning of a copper-containing solution, a high quality, uniformly-plated cathode copper product 116 may be realized without subjecting the copper-containing solution to a solvent/solution extraction process prior to entering the electrowinning circuit.

As those skilled in the art are aware, a variety of methods and apparatus are available for the electrowinning of copper and other metal values, any of which may be suitable for use in accordance with the present invention, provided the requisite process parameters for the chosen method or apparatus are satisfied. For the sake of convenience and a broad understanding of the present invention, an electrowinning circuit useful in connection with various embodiments of the invention may comprise an electrowinning circuit, constructed and configured to operate in a conventional manner. The electrowinning circuit may include electrowinning cells constructed as elongated rectangular tanks containing suspended parallel flat cathodes of copper alternating with flat anodes of lead alloy, arranged perpendicular to the long axis of the tank. A copper-bearing leach solution may be provided to the tank, for example at one end, to flow perpendicular to the plane of the parallel anodes and cathodes, and copper can be deposited at the cathode and water electrolyzed to form oxygen and protons at the anode with the application of current.

The primary electro chemical reactions for electrowinning of copper from acid solution are believed to be as follows:

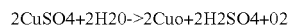

$$2CuSO_4 + 2H_2O \rightarrow 2Cuo + 2H_2SO_4 + O_2$$

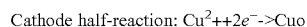

Cathode half-reaction: $Cu^{2+} + 2e^- \rightarrow Cuo$

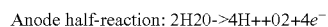

Anode half-reaction: $2H_2O \rightarrow 4H^+ + O_2 + 4e^-$

Turning again to FIG. 1, in an exemplary embodiment the invention, product stream 107 is directed from electrolyte recycle tank 1060 to an electrowinning circuit 1070, which contains one or more conventional electrowinning cells. It should be understood, however, that any method and/or apparatus currently known or hereinafter devised suitable for the electrowinning of copper from acid solution, in accordance with the above-referenced reactions or otherwise, is within the scope of the present invention.

In accordance with an exemplary aspect of the invention, electrowinning circuit 1070 yields a cathode copper product 116, optionally, an off gas stream 117, and a relatively large volume of copper-containing acid, herein designated as lean electrolyte streams 108 and 115. As discussed above, in the embodiment illustrated in FIG. 1, lean electrolyte stream 108 may be directed to copper precipitation stage 1010 via lean electrolyte stream 125 (which, as discussed hereinbelow, may comprise a portion of lean electrolyte stream 123 from second electrowinning circuit 1090), and lean electrolyte stream 115 is directed to electrolyte recycle tank 1060. As those skilled in the art are aware, it may be preferable to regulate the flow amount, flow direction or other aspects of the lean electrolyte streams directed from electrowinning circuit 1070 to further maximize the efficiency of the described invention.

In accordance with an exemplary aspect of an alternative preferred embodiment, a portion of lean electrolyte stream 108 is directed to pressure leaching feed stage 1031. Lean electrolyte stream 108 may exhibit copper concentration sufficient to combine with pressure leaching feed stream 103 to further maximize the operational and economic efficiency of the present invention. In addition, as briefly noted above, stream 108 may provide suitable cooling liquid to pressure leaching step 1031.

Again referring to FIG. 3, in an exemplary alternative to an aspect of the invention, all of copper-containing stream 106 may not be directed to electrolyte recycle tank 1060. To achieve optimum operational and economic efficiency in accordance with various embodiments of the present invention, it may be desirable to direct a portion of copper-containing feed stream 106 to operations other than electrowinning. As depicted in FIG. 3, a portion of copper-containing stream 106 may be directed to pressure leaching feed stream 103. Moreover, a portion of copper-containing stream 106 may be directed to precipitation stage 1010.

Referring back again to FIG. 1, electrolyte stream 120 from first electrowinning circuit 1070—which comprises at least a portion of the lean electrolyte produced in first electrowinning circuit 1070 that is not recycled to other process operations—is subjected to further processing in a second electrowinning circuit 1090. In an exemplary aspect of the embodiment, lean electrolyte stream 120 is sent to electrolyte recycle tank 1080.

Electrolyte recycle tank 1080 suitably facilitates process control for electrowinning circuit 1090, as will be discussed in greater detail below. Lean electrolyte stream 120, which generally contains from about 20 to about 40 grams/liter of copper and from about 100 to about 180 grams/liter of acid, is preferably blended with lean electrolyte stream 123 from second electrowinning circuit in electrolyte recycle tank 1080 at a ratio suitable to yield a product stream 121, the conditions of which may be chosen to optimize the resultant product of electrowinning circuit 1090.

With reference to FIG. 1, copper from the product stream 121 is suitably electrowon to yield a pure, cathode copper product. In accordance with various aspects of the invention, a process is provided wherein, upon proper conditioning of a copper-containing solution, a high quality, uniformly-plated cathode copper product 122 may be realized without subjecting the copper-containing solution to a solvent/solution extraction process prior to entering the electrowinning circuit.

In furtherance of an exemplary aspect of the embodiment, second electrowinning circuit 1090 yields a cathode copper product 122, off gas, and a remainder volume of copper-containing acid, designated in FIG. 1 as lean electrolyte stream 123. In accordance with one exemplary embodiment, at least a portion of lean electrolyte stream 123 is directed to electrolyte recycle tank 1080 in an amount suitable to yield a product stream 121, the conditions of which may be chosen to optimize the resultant product of second electrowinning circuit 1090. Optionally, a portion of lean electrolyte stream 123 may be recycled to copper separation stage 1010 via stream 125 (which may also comprise a portion of the lean electrolyte produced in first electrowinning circuit 1070).

In accordance with various exemplary embodiments of the invention as illustrated in FIG. 3, lean electrolyte stream 123 is directed optionally, wholly or in part to electrolyte recycle tank 1080, electrolyte recycle tank 1060, and/or to copper precipitation stage 1010. Those skilled in the art will appreciate the ability to effectively manage stream flow control to other streams and operations of the invention. Although not illustrated as such in FIGS. 1 and 3, at least a portion of lean electrolyte stream 123 may optionally be directed for further processing in accordance with a process such as that illustrated in FIG. 2.

The present invention has been described above with reference to a number of exemplary embodiments. It should be appreciated that the particular embodiments shown and described herein are illustrative of the invention and its best mode and are not intended to limit in any way the scope of the invention. Those skilled in the art having read this disclosure will recognize that changes and modifications may be made to the exemplary embodiments without departing from the scope of the present invention. For example, although reference has been made throughout to copper, it is intended that the invention also be applicable to the recovery of other metals from metal-containing materials. Further, although certain preferred aspects of the invention, such as techniques and apparatus for conditioning process streams and for precipitation of copper, for example, are described herein in terms of exemplary embodiments, such aspects of the invention may be achieved through any number of suitable means now known or hereafter devised. Accordingly, these and other changes or modifications are intended to be included within the scope of the present invention.

The invention claimed is:

1. A method of recovering copper from a copper-bearing material, comprising the steps of:
    subjecting a feed stream comprising a copper-containing material and an acid to pressure leaching at a temperature of from about 100° C. about 250° C. to yield a product slurry comprising a copper-bearing solution and a residue;
    electrowinning copper from at least a portion of said copper-bearing solution in a first electrowinning stage to produce copper cathode and a first stage lean electrolyte stream;
    electrowinning copper from at least a portion of said first stage lean electrolyte stream in a second electrowinning stage to produce copper cathode and a second stage lean electrolyte stream; and
    recycling at least a portion of said first stage lean electrolyte stream to said pressure leaching step.

2. The method of claim 1, wherein said feed stream in said step of subjecting comprises at least one of a copper-bearing sulfide ore, a concentrate, and a precipitate.

3. The method of claim 1, wherein said feed stream in said step of subjecting comprises at least one of chalcopyrite, chalcocite, bornite, covellite, digenite, enargite, or mixtures or combinations thereof.

4. The method of claim 1, further comprising the step of separating at least a portion of said copper-containing material from said acid in said feed stream to yield a copper-containing feed stream comprising a copper-bearing material.

5. The method of claim 4, wherein said separating step comprises reacting at least a portion of the copper in a copper-containing electrolyte stream to precipitate at least a portion of said copper in said copper-containing electrolyte stream as copper sulfide in said feed stream.

6. The method of claim 4, wherein said separating step comprises reacting at least a portion of the copper in a copper-containing electrolyte stream in the presence of sulfur dioxide, whereby at least a portion of said copper in said copper-containing electrolyte stream precipitates as copper sulfide in said feed stream.

7. The method of claim 1, wherein said pressure leaching of said subjecting step comprises pressure leaching said feed stream in the presence of a surfactant selected from the group consisting of lignin derivatives, orthophenylene diamine, alkyl sulfonates, and mixtures thereof.

8. The method of claim 1, wherein said pressure leaching of said subjecting step comprises pressure leaching said feed stream in the presence of a surfactant in an amount of from about 2 to about 20 kilograms per tonne of concentrate in the copper-containing feed stream.

9. The method of claim 1, wherein said step of electrowinning copper from at least a portion of said first stage lean electrolyte stream in a second electrowinning stage comprises electrowinning copper from at least a portion of said first stage lean electrolyte stream without subjecting said first stage lean electrolyte stream to solvent/solution extraction.

10. The method of claim 4, wherein said step of electrowinning copper from at least a portion of said first stage lean electrolyte stream in a second electrowinning stage comprises electrowinning copper from at least a portion of said first stage lean electrolyte stream without subjecting said first stage lean electrolyte stream to solvent/solution extraction.

11. The method of claim 1, further comprising the step of using a portion of said second stage lean electrolyte stream in a leaching operation.

12. The method of claim 4, further comprising the step of recycling a portion of said second stage lean electrolyte stream to said separating step.

* * * * *